June 18, 1963 M. RAUSCH 3,094,333
MACHINE FOR THE UNIFORM DISTRIBUTION OF MANURE AND
THE LIKE SUBSTANCES OVER GROUND
Filed Nov. 23, 1959 6 Sheets-Sheet 1

Inventor
Martin Rausch
By Michael S. Striker
Attorney

June 18, 1963  M. RAUSCH  3,094,333
MACHINE FOR THE UNIFORM DISTRIBUTION OF MANURE AND
THE LIKE SUBSTANCES OVER GROUND
Filed Nov. 23, 1959  6 Sheets-Sheet 2
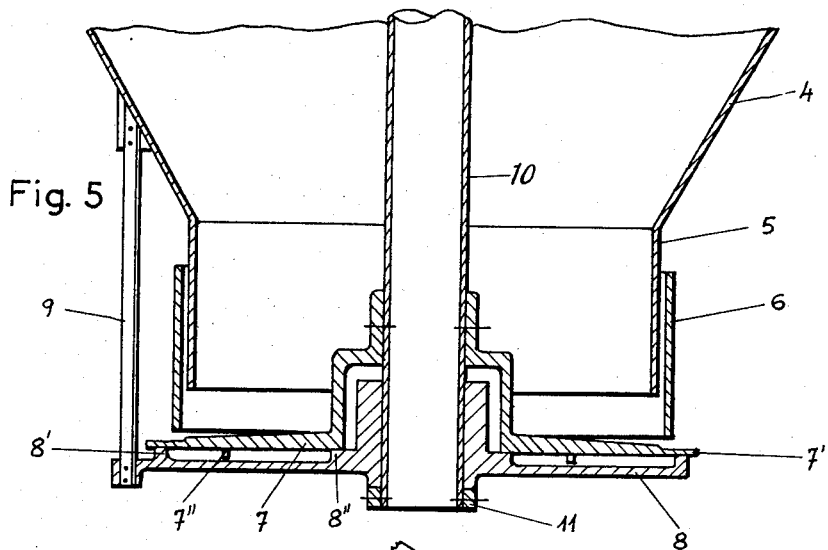
Fig. 5
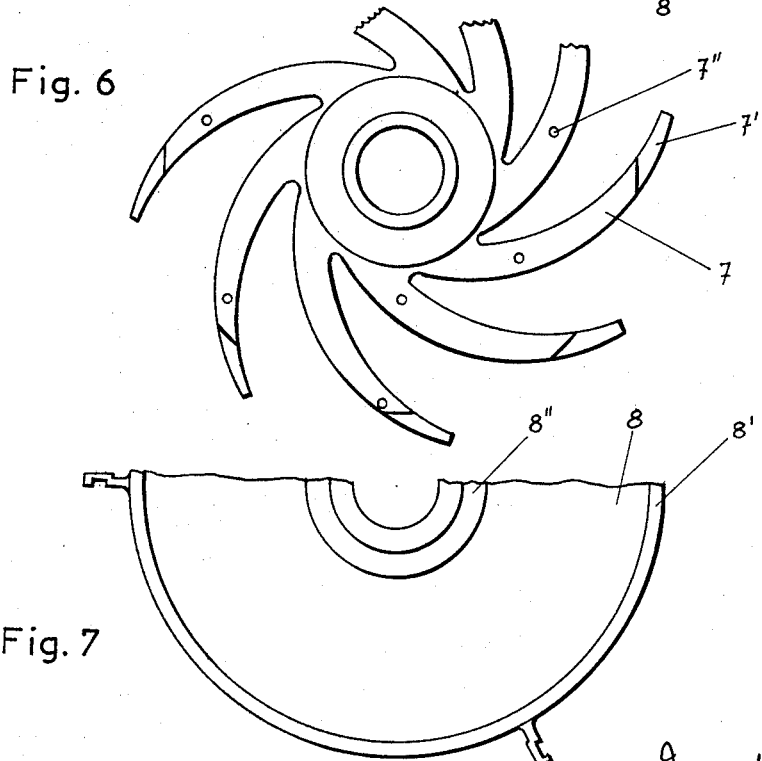
Fig. 6
Fig. 7

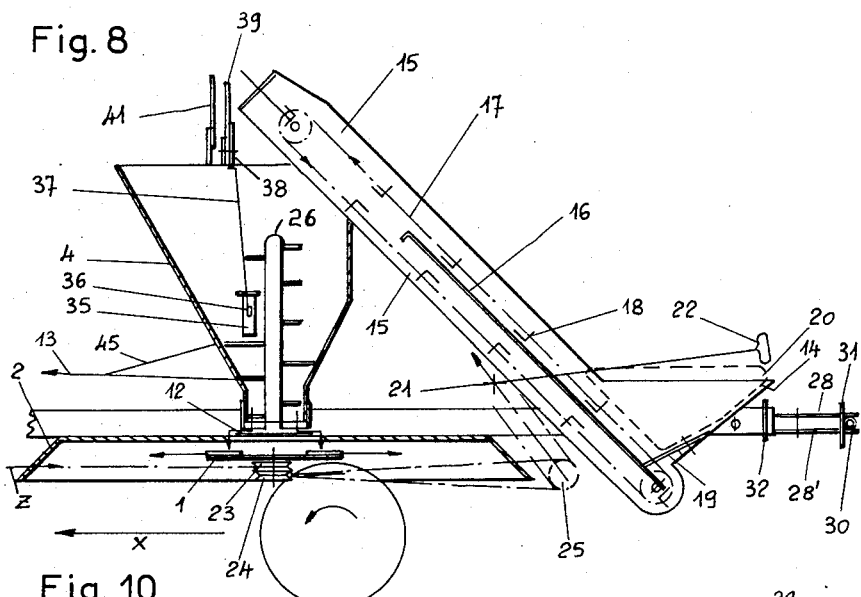
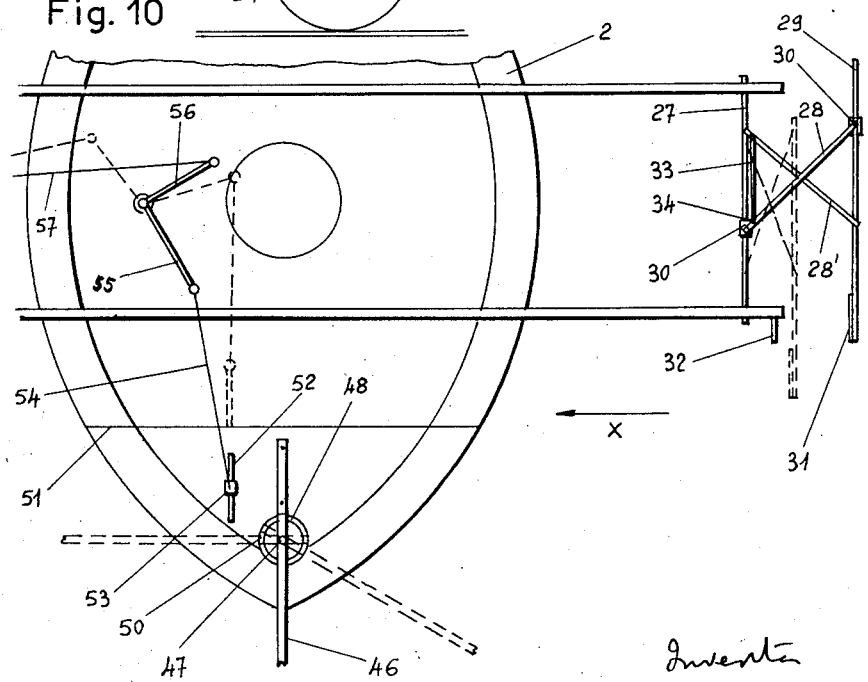

June 18, 1963  M. RAUSCH  3,094,333
MACHINE FOR THE UNIFORM DISTRIBUTION OF MANURE AND
THE LIKE SUBSTANCES OVER GROUND
Filed Nov. 23, 1959  6 Sheets-Sheet 4
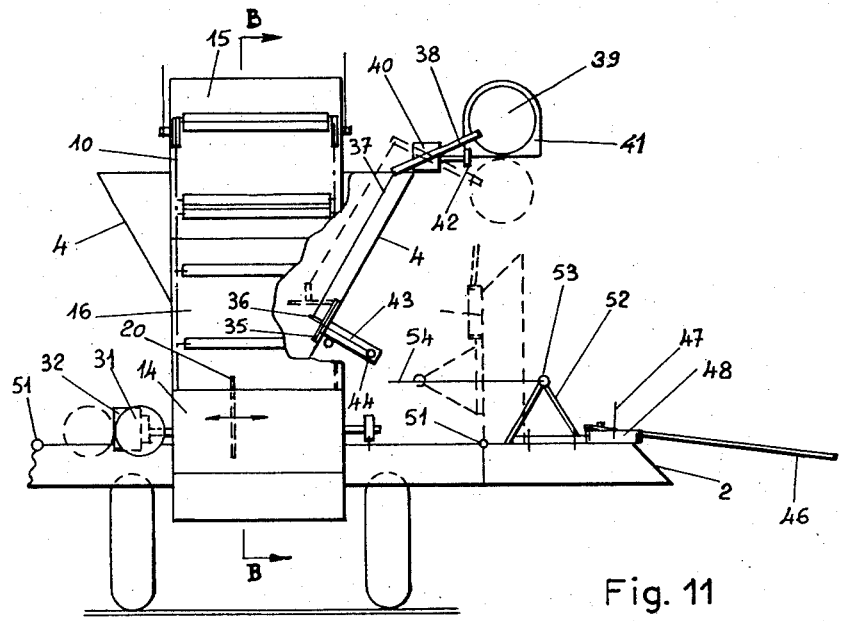
Fig. 9
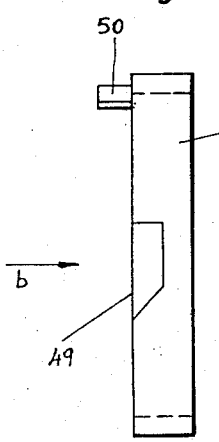
Fig. 13
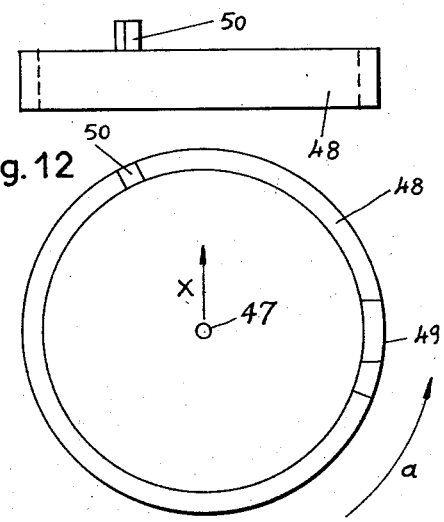
Fig. 11
Fig. 12

June 18, 1963

M. RAUSCH 3,094,333

MACHINE FOR THE UNIFORM DISTRIBUTION OF MANURE AND THE LIKE SUBSTANCES OVER GROUND

Filed Nov. 23, 1959

Inventor
Martin Rausch
BY Michael S. Striker
Attorney

United States Patent Office 3,094,333
Patented June 18, 1963

3,094,333
MACHINE FOR THE UNIFORM DISTRIBUTION OF MANURE AND THE LIKE SUBSTANCES OVER GROUND
Martin Rausch, Industriestrasse 6, Marburg an der Lahn, Germany
Filed Nov. 23, 1959, Ser. No. 854,754
Claims priority, application Germany Nov. 22, 1958
10 Claims. (Cl. 275—8)

In a machine serving for the distribution of substances which are to be spread over ground, said substances are generally, as well known, distributed by a horizontally rotating centrifugal apparatus, for instance a rotary plate, so as to be thrown against a vertical wall surrounding said apparatus on all sides, said wall limiting the path of the substances which are to be spread and, thereby, distributing uniformly the substances over a predetermined breadth during the forward movement of the machine, as a consequence of the particular shape of its generating lines. Said impact wall surrounds thus entirely the conventional centrifugal arrangement located coaxially therewith and subjected to a speedy rotation round a vertical shaft, said centrifugal arrangement urging the substances to be distributed along a path which is at least approximately horizontal against the impact wall. The latter holds the substances or material against further movement, so that said material is deflected or guided by said wall vertically and downwardly onto the surface which is to receive it.

The accompanying drawings illustrate the invention and in these drawings

FIG. 5 is a partial vertical cross section through the spreading mechanism of the machine of the present invention;

FIG. 6 is a partial top view of an element shown in FIG. 5;

FIG. 7 is a partial top view of another element shown in FIG. 5;

FIG. 8 is a partially sectioned schematic side view of a complete machine according to the present invention;

FIG. 9 is a schematic rear view of the machine shown in FIG. 8;

FIG. 10 is a partial schematic top view of the machine shown in FIG. 8;

FIGS. 11, 12 and 13 show details of the machine shown in FIGS. 8–10 to an enlarged scale;

Figure 3:
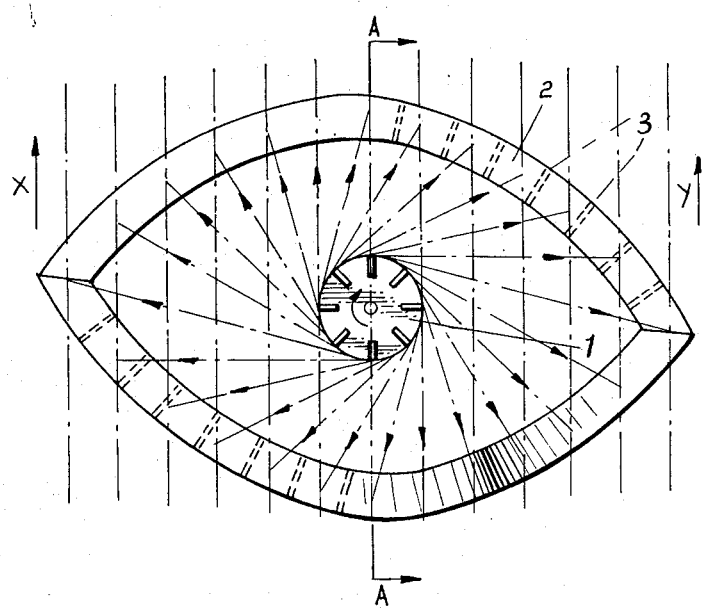
FIG. 3 is a schematic illustration of the lower portion of the machine of the present invention.

With a view to obtaining a uniform distribution of said material, the impact wall is generally given an elongated shape, the major axis of which extends substantially in a transverse direction to the direction of progression of the machine. The generating lines of the impact wall are defined by the crossing points of lines of projection extending in the shape of radial lines and corresponding to a number of uniformly spaced angular directions with corresponding equidistant lines parallel to the direction of progression of the machine, as illustrated in FIG. 3 of the accompanying drawings. The crossing points between the angularly spaced projection lines and the parallel lines define theoretically the outline of the impact wall. Since the material to be spread or scattered is projected by the disc of the centrifugal apparatus in a direction which is not radial, but tangential, the theoretical spaced angular directions should be drawn tangentially to said disc. The parallel lines drawn in dots and dashes define between one another longitudinal strips of ground of a uniform breadth which are subjected to a load of material projected onto them during progression, both to the front and to the rear. Since, theoretically, there is distributed a uniform amount of material by such a curvilinear structure on any of the parallel strips thus defined, this satisfies the conditions for a uniform distribution of the material thrown centrifugally over the entire breadth of the surface to be covered with the material and the amount of material thus distributed should correspond to the distribution illustrated diagrammatically in FIG. 1 of the accompanying drawings, said figure reproducing the heights of material measured behind the distributing machine.

Now, practice has shown that this assumption is true at the utmost in the case of pulverulent or ground material and certainly not in the case of a material constituted by coarse granules and, in particular, in the case of granular mineral manure. In fact, accurate experiments have shown that with such a material, the distribution is that illustrated diagrammatically in FIG. 2 of the accompanying drawings.

A long series of investigations has allowed me to find the reason for such irregularities in the distribution of the material. These reasons reside in the fact that the granular components of the material to be spread over ground are not guided accurately in a downward direction starting from the point of impact on the wall and, in fact, they bounce back on the wall to an extent which increases with the size and hardness of the particles and with the speed of their flight between the centrifugal projecting means and said impact wall. This results in that the outer sections of the surface which are to receive the material lying to the left and to the right with reference to the direction of progression, receive too little material, while the adjacent inner sections receive too much material at the expense of the first-mentioned outer surface. In the medial sections, the rebounding action is less felt.

Figure 2:
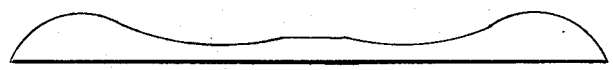
FIG. 2 is a diagrammatic view of the actual distribution of the material as obtained in practice.

Furthermore, it has been found that, in the case of granular material to be spread and, in particular, when the centrifugal device rotates clockwise, there is obtained at least to the front right-hand side of the direction of progression and to the rear left-hand side, after impact on the impact wall, a more or less considerable shifting of the particles along said wall with reference to the direction of their flight, so that said material is urged outwardly away from the section of the ground surface to be covered, lying in vertical registry underneath the point of impact and onto which said material is actually to drop. The sections of ground surface lying near the outer limits to the right and to the left receive too much material at the expense of the medial sections. FIG. 2 illustrates the actual distribution of the material, as obtained in practice.

Figure 4:
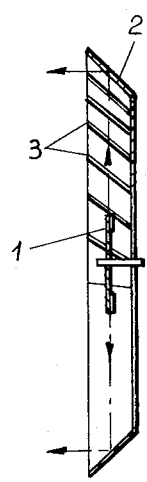
FIG. 4 is a vertical cross section of FIG. 3 taken along the line A—A of FIG. 3.

The above-disclosed drawbacks increase when the material is constituted by coarse particles and is subjected to a higher centrifugal speed. However, since the material may include, not only coarse particles, but also pulverulent elements and both types of material may have to be spread simultaneously, it is necessary to give the material a high speed, since, otherwise, the pulverulent fraction could not reach the impact wall along a rectilinear or almost rectilinear path. It is therefore of interest to remove all these sources of faulty distribution. This problem has been solved, as illustrated in FIGS. 3 and 4, showing, by way of example, the impact wall of my improved machine. According to my invention, the centrifugal arrangement 1 is surrounded by an impact wall 2, which is no longer vertical, but oblique throughout its periphery, so as to form an angle which is advantageously equal to about 135° with the direction of flight of the material to be distributed: this latter, when impinging on the wall, is no longer rejected obliquely, but shifted by an angle of 90° with reference to said direction of flight, so that it is deflected or projected vertically and downwardly.

FIG. 4, which is a vertical cross-section of FIG. 3, through line A—A, shows this progression, whereas FIG. 3 illustrates the path of the material to be distributed as it moves between the centrifugal means and the impact wall, said path being drawn with arrow-carrying dot-and-dash lines. The two independent arrows x and y show the direction of progression of the machine.

Furthermore, there is provided, on the inner surface of the impact wall in the case illustrated and at least in the areas to the right-hand front side and to the left-hand rear side with reference to the direction of progression and, possibly, throughout the periphery of the wall, a number of suitably spaced prongs 3 extending somewhat perpendicularly to the generating lines of the impact wall and adapted to prevent the lateral oblique sliding of the material over the wall, or reduce at least said sliding to an allowable minimum. These prongs may be made of wood, synthetic material or steel angle bars of a suitable size.

Figure 1:
FIG. 1 is a diagrammatic illustration of the correct distribution of fertilizing material to be spread by the machine of the present invention.

This execution of the impact wall is one of the features ensuring a uniform distribution of the material to be distributed, whatever may be its structure, whereby it is possible to obtain in practice a uniform distribution corresponding to the diagram of FIG. 1. In the case of abnormal conditions of temperature, air moisture and state of the material to be distributed, it is however necessary to improve the machine still further. It has been found that various types of material to be distributed do not move off the impact wall immediately after the impact, so as to drop or slide downwardly, but remain adherent to the impact wall. This forms thereby a layer of material which breaks away or crumbles away only when it has reached a sufficient thickness. Thus, the fine and uniform distribution of the material which it was attempted to obtain with the machine, was baffled thereby hitherto. The additional expensive arrangements proposed for this purpose made the execution of the machine too expensive, and gave not entirely satisfactory result.

Whereas impact walls of normal steel sheets showed speedily a rough surface after a short duration of operation by reason of its ready corrosion and liability to be attacked by acids, so that the adherence to the material was thereby furthered, said walls were made hitherto of alloy steel sheets. The latter do actually retain a smooth surface, because they resist the attack of acids and are very resistant to frictional wear, but they could not however prevent the adherence of certain types of material, in particular when the distribution of material having a tendency to adhere had to be executed under low temperature or moist atmosphere conditions.

Now, it has been proposed, according to the invention, to provide an impact wall made of an elastic material preventing the condensation of water on its surface and, in particular, I may resort for this purpose to a wall made of synthetic material having a smooth surface resisting frictional wear, so as to cut out entirely the objectionable phenomena referred to or, at least, to reduce same down to an extent for which they are no longer troublesome. In such a case, in fact, there is no condensation of water on the wall under low temperature conditions and even under frosting conditions, said condensation of water furthering the adherence of the ground material to be distributed, while the elasticity of the synthetic material allows the impact of the material on it to produce a movement which still further reduces to an at least considerable extent the adherence of such material. The novel oblique arrangement of the impact wall provided by my invention, as illustrated in FIGS. 3 and 4, is also favorable in this respect.

The use of synthetic material for the impact wall still further reduces the cost price of my improved machine, together with its weight.

Instead of using conventional centrifugal discs in machines of the type considered for the uniform distribution of a material to be spread over ground, I may resort to centrifugal arrangements wherein, for instance, rotary distributing arcuate projections are caused to sweep over a round bottom plate with a flat upper surface forming the lower closing cover of the container for such material, so as to feed outwardly the material lying on said bottom plate and also on and between the arcuate projections, thereby to make the material pass through a circular slot, the breadth of which is adjustable. In such a case, however, a drawback arises consisting in that the material, when hygroscopic and liable to bonding, often adheres to the upper surface of the bottom plate and forms on it a resilient layer hardening gradually after the manner of a window putty, so that it resists the scraping action of the rotary distributing projections and, finally, as it increases in size, it may either break the associated parts or lock the centrifugal arrangement against operation. The removal of said layer or the cleaning of the bottom plate requires a tedious partial dismantling of the arrangement and, consequently, an expenditure of time which makes it entirely uneconomical.

The example illustrated in FIGS. 5 to 7 shows how this objectionable result may be cut out. FIG. 5 shows a centrifugal arrangement with a container 4 forming a hopper extending into a cylindrical lower part 5, which latter is surrounded by an annular vertically adjustable also cylindrical annulus 6. A star-shaped member 7 rotating clockwise during operation is provided with outwardly tapering distributing projections 7′ and a round bottom plate 8 extending underneath said star-shaped member serves as a lower cover for the container, said lower plate being held fast, for instance, as illustrated, by three arms 9 or rods rigid with the container 4.

FIG. 6 is a view from above of the distributing star-shaped member 7—7′ including, for instance, as illustrated, eight operative incurved projections.

FIG. 7 is a view from above of a part of the bottom plate 8 according to the invention.

The distributing star-shaped member 7—7′ is rigid with a tubular shaft 10 and is driven by the latter for operation, while its weight is absorbed by the bottom plate 8 on which it rests, and it is held against upward sliding by a securing ring 11 which bears on the lower surface of the hub formed on the bottom plate 8.

The annularly depressed shape given to the bottom plate 8 is novel. Its upper peripheral edge is formed by the annular bead along its outer periphery 8′, while it is provided with an inner raised flange 8‴, the upper surface of which is flush with that of the outer peripheral bead, while the annular space between said bead and flange forms a depression or trough.

Furthermore, the studs 7″ projecting downwardly with reference to the distributing projections 7 and rigid with the latter are also novel.

My improved trough-shaped plate 8—8′—8″ is such that the entire star-shaped member 7—7′—7″ including the members rigid therewith, such as the part 10 and the like, are no longer in contact with the entire surface of the bottom plate and rest solely on the two narrow annular projections 8′ and 8″ thus formed, whereby the scraping action is still further increased to an extent such that any dangerous layer of material can no more be formed.

As a further safety, the stud-shaped projections 7″ are provided on the distributing projections 7 extending preferably along a spiral, as illustrated. Said studs 7″ permanently stir the material lying underneath the star-shaped member in the recessed section of the bottom plate and they prevent any adherence between the material and the bottom plate.

The machine for distributing material, of the type referred to, shows however further drawbacks. Thus, the loading with material to be distributed required hitherto two men by reason of the small capacity of the container provided therefor, which had consequently to be refilled very often, while the size of the container was limited, both by the reduced height required for manual refilling and, also, by the necessary steepness of the container walls. There were no arrangements for showing whether the material was exhausted, so that the driver might refill the containers with fresh material in proper time, as soon as he was near the carriage filled with the provision of material to be used, said carriage being located advantageously along the periphery of the field over which the material is to be spread.

When mixing a number of different materials, such as manure or fertilizer containing nitrogen, phosphoric acid and potash, the proportions could not be controlled as desired and no indication of the breadth of operation could be obtained in a satisfactory manner by the arrangements provided hitherto.

These problems are very difficult to solve, chiefly for small agricultural concerns, since the expensive machines proposed hitherto produce no satisfactory work and their daily yield is very small, so that the agriculturists are generally constrained to return to the primitive method of spreading mineral manure by hand.

My invention provides a solution for these various drawbacks.

FIGS. 8 and 9 show, by way of example, a distributing machine adapted to progress over ground, FIG. 8 being a vertical sectional view of the machine through line B—B of FIG. 9, the direction of progression being illustrated by the arrow at the lower left-hand end of FIG. 8.

FIG. 9 is a view of the machine from the rear, illustrating clearly signalling means, means warning of the approaching exhaustion of the material in the container, means for defining the track breadth and means allowing a single man to shift the machine out of its broad operative position into a narrow position corresponding to transportation and reversely.

FIG. 10 is a partial view from above after removal for sake of clarity of the container and conveyor for the material.

FIGS. 11, 12 and 13 show important details of this novel machine on an enlarged scale.

In the movable machine illustrated by way of example, the material to be distributed is conveyed out of the lower end of the hopper-shaped container 4 through a round opening of an adjustable diameter onto a bottom plate 12 and, thereby, it is fed to the rotary centrifugal disc 1 underneath the plate, so that the latter projects peripherally the material onto the impact wall 2 surrounding it. The centrifugally acting disc 1 is driven independently through a stub shaft on the tractor drawing the machine, said disc being advantageously driven through a trapezoidal belt, the line of action being shown by the arrow z. This conveying of the material through the hopper 4 is not controlled by the same stub shaft, but by the driving axle of the machine itself, i.e. through the progression of the latter over ground, and it may be made operative or inoperative alternatingly through the operation of the cable 13 by the driver of the tractor on his seat.

The container 4 illustrated in FIGS. 8 and 9 of the drawings provides a very large capacity, since it may be fed no longer by hand, but through the oblique conveyor illustrated in FIGS. 8 and 9 and comprising an input chamber 14, a conveying trough 15 with lateral walls, an intermediate carrier surface 16 and the actual conveyor 17 including two chains carrying the bucket elements 18 passing over two upper driven chain wheels and over two lower chain wheels. Said conveyor includes also the closing plate 19, the vertical partition or partitions 20 and the control system 21 provided with a handle 22 actuated from the actual machine for starting and stopping the conveyor.

When the machine described is brought by the tractor into proximity with the carriage carrying the provision of manure or the like material and is shifted rearwardly towards the latter, the control through the stub shaft shown by the arrow z drives the centrifugal disc 1 and is not stopped even during the filling, which was not customary hitherto. The driving shaft for the centrifugal disc or the pulley 23 carrying the trapezoidal belt is secured to a further belt-carrying disc 24, which transmits the power of the stub shaft through the linkage 25 and the control system 21, so as to actuate the oblique conveyor 17. The tractor driver may then climb onto the carriage carrying the provision of the material and shovel the material from said carriage onto the chamber 14 lying at a low level and feeding the conveyor, or else, it is possible to empty the material-filled bags into said chamber, and to, this end, it is sufficient to shift once the control rod 21 through the handle 22, so as to start the conveyor into motion. The conveyor moves in the direction of the arrows and feeds the material lying in the chamber 14 into the hopper-shaped container. When the latter is filled, the conveyor is stopped through further traction on the rod 21, which is then set inside a fork which is not illustrated. The intermediate plate 16 extending throughout the breadth of the conveyor and the terminal closing plate 19 prevent the material from entering the lower section of the conveyor, because this would lead to stoppages and increases in power requirements. The closing plate 19 is made of elastic material, so that it yields to allow the passage of the successive buckets 18 and returns speedily thenafter into its lower position, so as to seal the collecting chamber 14 by engaging the intermediate plate 16.

If it is desired to introduce simultaneously a plurality of different materials for a single operation, the intimate mixture of which materials is generally required, I resort to one or more partitions 20 which may be shifted laterally, as illustrated by arrows in FIG. 9. These partitions subdivide the chamber 14 in accordance with the desired proportions of the different materials, taking into account their specific weight; it is thus possible to feed simultaneously two, three or four different materials substantially in the desired proportions towards and into the hopper 4. This leads, without any further loss of time and in a substantially fool-proof manner, to a perfect mixing which is brought to a finish by the stirring means 26 in the hopper 4 and, lastly, by the centrifugal disc 1.

If it is desired to obtain a particularly accurate mixing, the conveyor should operate intermittently each time the input chamber 14 has been filled with the different sorts of material in the desired proportions and then, the stopping and starting is obtained through the cooperating handle.

It is however possible, through a suitable execution of the stirring means in the hopper 4, to obtain a still greater improvement in the mixing and to provide, furthermore, for an increased capacity, since this allows giving the wall of the hopper a lesser slope than hitherto without any risk of the material not following exactly the requirements of its distribution.

Figure 14:
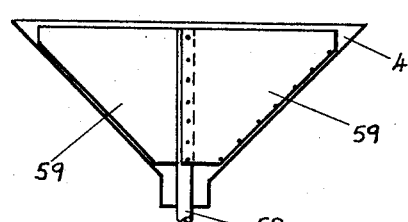
FIGS. 14–19 show various modifications respectively in side view and top view of the hopper arrangement for the machine of the present invention.
Figure 15:
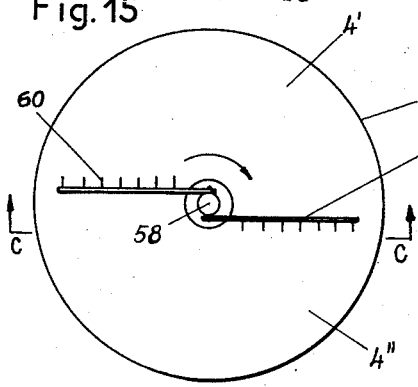

FIG. 14 is a cross-section through line C—C of FIG. 15 illustrating in plan view the container 4; the latter forms the hopper, the flat walls of which slope at about 45°, while its height does not rise with the capacity to the same extent as if its walls were steeper. In the middle of the hopper, there extends a vertical shaft 58 which is connected rigidly near the lower end of the hopper with the member urging the material out through its clockwise rotation executed preferably slowly during operation, so as to shift the material to be distributed outwardly out of the hopper, for instance through a round opening of an adjustable diameter.

In FIGS. 14 and 15, the partitions or wall means 59 secured to the shaft 58, which are, for instance, in the number of two, extend entirely or almost entirely throughout the height of the hopper and throughout or almost throughout the radial extent of the hopper between the shaft 58 and the outer wall. These partitions subdivide the inside of the hopper into two advantageously equal sections or compartments 4' and 4''. The partitions 59 are however not rigid, but flexible and made, for instance, of elastically bending synthetic material.

Along the longitudinal ridge of the partitions facing the wall of the hopper, said partitions carry rack- or bucket-shaped members 60 facing the direction of operation.

The operation of the arrangement described is as follows: assuming only one type of manure is to be distributed, the compartments of the hopper 4' and 4'', as defined by said partitions, are both filled with said manure. However, if several types of manure are to be used for the same operation, say three types in the ratio as from 3 to 2 and to 1, to wit 300 cwt. of manure of the first type, 2 cwt. of the second type of manure and 1 cwt. of the third type per unit of surface, it is necessary to pour the 3 cwt. of the first type into the compartment 4' and the 2 cwt. of the manure of the second type together with the 1 cwt. of the third type into the compartment 4''. This being done, a reverse distribution is executed with the 3 cwt. of the first type in the second compartment 4'' and the 2 cwt. of the second type and the 1 cwt. of the third type in the compartment 4'. This procedure is continued with the same alternation until the two compartments are filled symmetrically as to the amounts introduced into them.

Figure 16:
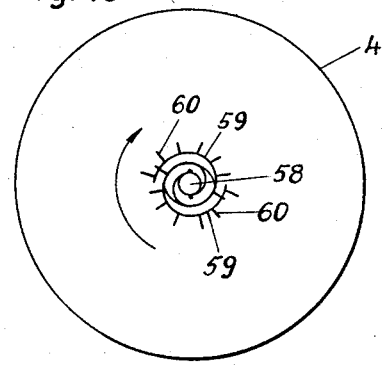

When it is desired to distribute or to pour out the material contained in the hopper by turning slowly and clockwise at a uniform speed the shaft 58 rigidly connected with the output means, the partitions 59 wind at first round the shaft 58, somewhat as illustrated in FIG. 16. The buckets or the like members 60 are thus constrained to face the material surrounding the shaft 58 and, by reason of the elastic pressure produced by said partitions 59, they constrain said material into an eccentric flowing or sliding movement down to the lower opening, the speed of said movement matching accurately the requirement of material distribution. Thus, the formation of bridges of material and the adherence of said material to the comparatively flat walls of the hopper are prevented and, furthermore, when several types of manure are filled simultaneously, a good mixing of the latter is obtained.

The outer edges of the partitions 59 carrying the buckets or the like members 60 move outwardly and elastically in an eccentric manner, so as to accompany the gradual removal of the contents of the hopper until the expanded position of the partitions illustrated in FIGS. 14 and 15 is reached again, after complete exhaustion of the material.

Although, in the example described and illustrated, only two partitions are mentioned, any plurality of such partitions may be provided, so that it is possible to obtain a plurality of compartments of equal sizes, or otherwise.

Figure 17:
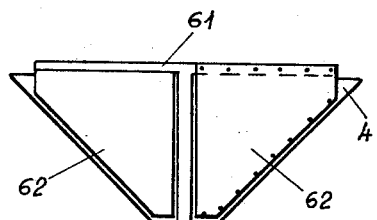
Figure 18:
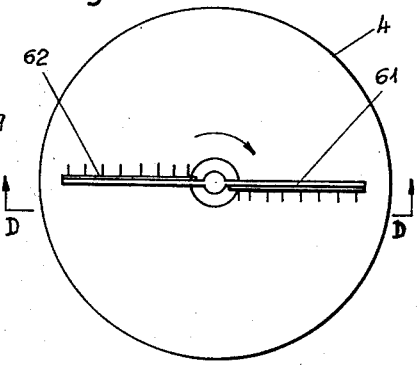
Figure 19:
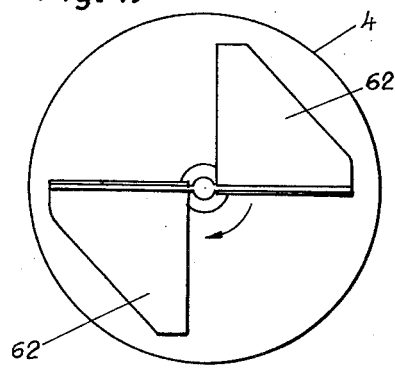

Furthermore, the yielding partitions are not necessarily secured to the vertical shaft 58. They may also, as illustrated in FIGS. 17 and 18, FIG. 17 being a cross-section through line D—D of FIG. 18, be secured to a horizontal cross-member 61 lying above the container and adapted to rotate during operation round its middle point, for instance. When extending in their inoperative position, across the hopper, these partitions 62, the number of which is equal to two, at least, subdivide the empty hopper 4 into a plurality of compartments of equal sizes, or otherwise, whereas, during operation, they are bent upwardly out of the filled hopper, as illustrated in FIG. 19 and, from this upper position, they return under the action of their elasticity with the bucket or the like members into their positions facing the wall of the hopper, possibly along their lower edges, so as to produce through the latter a downward sliding of the material to be distributed through the lower opening and also the mixture of the different materials required, until said partitions return into the expanded inoperative position illustrated in FIGS. 17 and 18. Furthermore, the yielding partitions may also be secured to the container wall, whereas members secured, for instance, to the shaft 58 and rotating during operation for stirring, mixing and/or conveying purposes, sweep at least partly between the partitions through slots in the partitions, or through the gaps between the latter.

Figure 20:
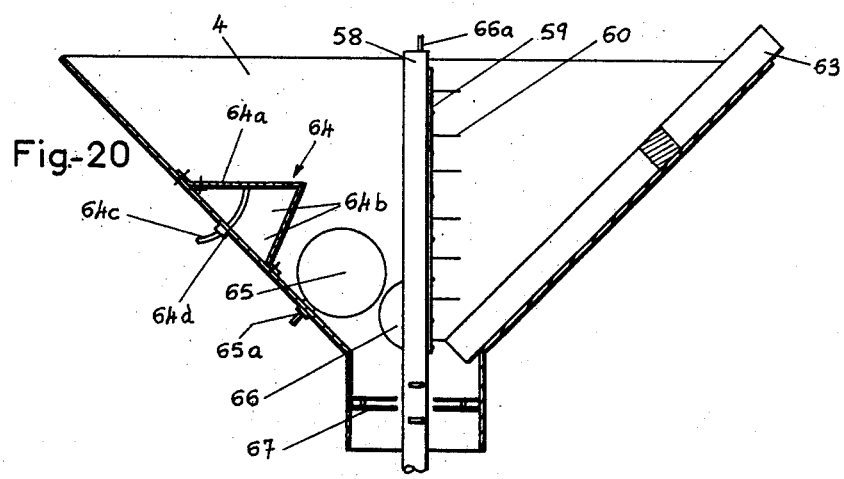
FIGS. 20 and 21 show respectively a cross section and a top view of a further modification of this hopper arrangement.
Figure 21:
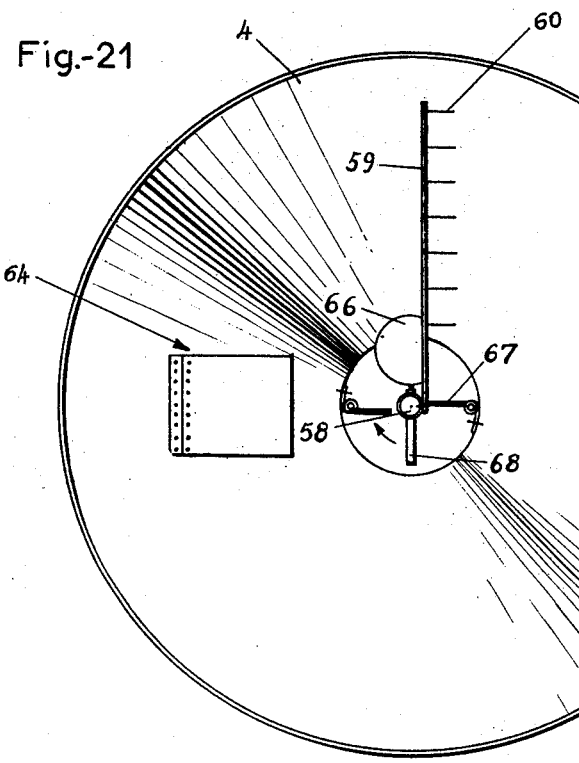

If it is also desired to prevent the material, for instance during the running of the machine, from being compacted and, thereby locking the moving members inside the hopper 4, the execution of the machine according to FIGS. 20 and 21 provides a remedy to this drawback.

FIG. 20 shows the hopper-shaped distributor container 4 in vertical cross-section with its central upright or shaft 58 showing a number of different possible embodiments.

FIG. 21 shows the same hopper 4 with the upright 58 and further modifications in plan view. The material to be distributed flows out of the hopper through an exhaust system rigid with the shaft or upright 58 and rocking therewith in the conventional manner.

According to my invention, the objectionable compacting of the material inside the hopper can no longer act detrimentally on the intermittently operating or rotating members mixing, grinding or removing the material and this is prevented or at least considerably reduced by the fact that, preferably in the lower section of the hopper, a chamber is left free during the filling operation and up to the starting of the distributor, in a manner such that no material is allowed to enter said chamber, which opens only just before the starting of said rotary members, so that the filling material may flow down to said chamber or slide into it and, thereby, the compacting which has arisen is now relieved, or at least reduced to a normal value. Through the agency of the beam 63, this is performed as follows: before the filling of the hopper, the beam 63, or a similar member with a rectangular or the like cross-section, for instance in the shape of a club with a thicker lower section, is inserted inside the hopper and removed after the starting of the machine with a full hopper, just before beginning operation. The space filled by said beam is then freed and, consequently, the vibrations due to the progression over ground release the compacted material before and during operation, so that the members provided for the grinding, mixing and dropping out of the material may operate freely, the material being released in the direction leading to said now empty space.

Similarly, the member 64 forms bellows with a solid cover 64a movably and fluidtightly connected with the hopper wall, said bellows being provided with flexible side-walls 64b along the three sides of said cover, which side-walls are fluidtightly secured together, to the cover 64a and also to the hopper wall, so that an empty space is formed in the position illustrated. A control rod 64c extends through the bellows and is connected with the cover 64a, so as to hold the latter through the securing means in the position illustrated, occupied during the filling of the hopper. Just before the starting of the operative members inside the hopper, the securing means 64d are released, the rod 64c is drawn out or released, so that the bellows 64 collapse and the air contained inside them passes with the rod 64c out of the bellows through the opening provided for this purpose in the hopper wall, whereby the empty space occupied hitherto by the bellows 64 is now free.

As to the member 65, it is constituted by a rubber or the like air-filled ball inflated before the filling of the hopper through the valve 65a and the air filling which is also released before the starting of the operative members inside the hopper, whereby the same result is obtained as with the precedingly described parts 63 or 64.

Now, it is possible to provide the hopper or the like container with grinding, mixing, stirring and exhaust members, somewhat in the manner illustrated in FIGS. 14 to 19, such as flexible partitions 59 extending from the shaft or upright 58 at the center, up to the hopper wall, so as to sweep over the latter during operation. In such a case, the above-mentioned member 65 is not secured to the hopper wall, but at a point where it cannot be damaged and forms no hindrance, for instance as illustrated by the ball designated by 66 in FIG. 21, said ball being secured to the central upright 58 to rotate therewith during operation, while it may be inflated and released of its air through the upwardly projecting valve 66a.

The reliability in operation obtained by one or more of the members such as 63 to 66 is still enhanced by the elastic arms 67 constituted, for instance, by steel blade springs which are urged elastically rearwardly, so as to collapse or to yield when the central shaft 68 rotates with the bucket or the like stirring member, in contradistinction with any rigid arm, this elastic rearward movement being operated chiefly at the beginning of operation, whenever the material is still highly compacted underneath the members 63 to 66, which would otherwise lead to a breaking of various parts, more particularly when foreign bodies are present in the material. The arms 67 are essential when resorting to members such as 63 to 66, since they are intended to prevent any rotation of the material to be distributed in the lower section of the hopper. The risk of a rotation of the material is, in fact, greater when the pressure exerted on the material through its upper surface is smaller.

The saving of the presence of a second man for starting the rearward movement of the machine in proximity with the carriage carrying a provision of material is obtained through the new automatic signalling device constituted, as illustrated in FIG. 10, by the following chief components: the front transverse girder 27, the toggle joint 28—28', the rear shaft 29 adapted to slide rearwardly, the two sliding supports 30, the signalling disc 31, the covering screen 32 and the rubber strip 33, said parts being also shown partly in FIGS. 8 and 9. The four rods of equal lengths forming the toggle link 28—28' are pivotally secured together at their middle point. Of these, the ends of the two rods 28' are pivotally secured to the shafts 27 and 29, while the ends of the two rods 28 are pivotally secured above and below the supports 30, which are slidingly carried on the shafts 27 and 29. The signalling disc 31 is rigid with the left-hand end of the shaft 29 and the covering screen 32 is rigid with the chassis of the machine. The rubber strip 33 connects the toggle link arms 28 and 28' together and urges them into their inoperative position in contact with the bolt 34, so that the rear shaft 29, unless it is subjected to an opposing force, projects permanently to a predetermined extent, to the rear of the machine and beyond the latter, while the signalling disc 31, when viewed by the tractor driver, lies behind the covering screen 32 and is concealed thereby.

The height of this arrangement matches the height of the carriage carrying the provision of material.

If the tractor driver urges the machine rearwardly towards said carriage, the shaft 29 engages first said carriage and, upon further movement, the rubber strip stretches, while the front sliding support 30 runs over the shaft 27 towards the left and the rear shaft 29 yields and moves obliquely towards the left with reference to the direction of progression of the machine until it impinges against the rear end of the machine chassis, which prevents any further movement, while simultaneously the signalling disc 31 moves transversely with reference to the screen 32, so that it is now fully within sight of the tractor driver, as illustrated in dotted lines in FIG. 10. FIG. 9 also shows this new position of the signalling disc in interrupted lines.

In practice, the shaft 29 is protected against damage by a bumper or baffle bar, not illustrated, extending behind it and surrounding it on the rear. Since it was not possible for the tractor driver to observe hitherto from his seat the progression of the consumption of material while driving, he could hardly ascertain whether the machine was still distributing or was running idle and, consequently, a second man was necessary for this purpose. The latter is now no longer necessary and the part played by him is cut out through a better execution of the machine. This is obtained by an arrangement comprising chiefly a plate 35 (FIG. 8) arranged at a suitable level in the hopper 4 and pivoting after the manner of a door on the upper wall, said plate 35 being associated with a projection 36, a control cable 37, a lever arm 38, a signalling disc 39, a bracket 40, a covering screen 41, a sliding control member 42, a securing rod 43, a securing cable and ring 44 and a jack with its releasing cable 45. This signalling system operates as follows: before filling the hopper 4, the plate 35 is held fast in the position illustrated in FIGS. 8 and 9 and this is obtained by drawing out the securing cable provided with a ring 44 and extending outwardly of the hopper, while the jack at the rear end of the cable 45 is inserted through the ring 44 into the guiding socket for the securing rod 43. Thus, the signalling disc 39 is held in the starting position illustrated, so as to be invisible or substantially invisible for the tractor driver, since it is concealed from his field of view by the covering screen 41.

This being done, the hopper 4 is filled with material which covers directly the inner surface of the plate 35, so that the latter is now held in the starting position illustrated without it being necessary to hold it any more through the ring 44 and the jack 45. When the hopper is filled and before the beginning of distribution or just at said beginning, the safety means described including the jack 45 must be released. Since, however, there is a risk of the tractor driver forgetting to do so, the jack-carrying cable 45 is connected with the main cable 13 in a manner such that, as soon as the main cable is actuated by the tractor driver, the jack 45 is drawn automatically out of the guiding socket for the securing rod 43 and out of the ring 44.

From this moment onwards, the plate 35 is held solely by the pressure of the material to be distributed inside the hopper in the position illustrated and this lasts until the contents of the hopper have been removed down to the level of the plate 35. At the moment at which the pressure of the material on the plate 35 has become lower than the action of the weight of the signalling disc 39 transmitted through the lever arm 38, the cable 37 and the projection 36, the plate 35 rocks and enters the horizontal position illustrated in interrupted lines in FIG. 9, so that the signalling disc 39 drops into the position drawn also in interrupted lines for which it is fully visible for the tractor driver.

The tractor driver should set his mirror in a manner such that he cannot fail to see said signal behind him. It is also possible to produce an acoustic signal. This is provided by the sliding control member 42 connected through a cable with the hooter of the tractor. Upon lowering of the signalling disc 39, the lever arm 38 slides along the control member 42 and closes during the short contact period lasting, say one or a few seconds, a switch over said hooter circuit, the hooter then releasing an acoustic signal during said period. The driver will, in all cases, ascertain at the proper moment that the provision of material in the container is exhausted to an extent such that a refilling is necessary.

FIGS. 9 to 13 show a further embodiment of the novel arrangement defining the track breadth to either side of the machine, said arrangement including an indicator arm 46, the outer end of which carries a chain or the like member dragging on the ground to draw a track on the field, whereby it is easier to the driver to drive along the desired path.

The indicator arm 46 is pivotally secured to the guiding bolt 47, while it rests on the guiding ring 48 provided with a lateral recess 49, so as to be locked in the latter in its operative position, while it glides over said ring when it has to escape a hindrance or when it has to be folded back for transportation, its pivotal movement being, in both cases, limited by the abutment 50 (FIG. 12). Furthermore, a compression and torsion ring is fitted over the guiding bolt 47, the action of said ring being illustrated in FIGS. 12 and 13 by the arrows *a* and *b*. It should be considered that the arrangement illustrated in FIGS. 9 to 13 is intended for the right-hand side of the machine and is the image in a mirror of the arrangement illustrated in FIG. 10 for the left-hand side of the machine.

During the distribution of the manure, the torsion and compression spring urges the arm 46 into a direction perpendicular to the direction of progression of the machine, as illustrated in FIGS. 9 and 10. If the arm 46 meets a hindrance, it is shifted and moves rearwardly over the oblique side of the recess 49 against the pressure of the spring, until it impinges against the abutment 50, which cuts out any possibility of breaking any part; the arm subsequently projects again forwardly when the hindrance has been passed, as provided by the pressure of the spring which returns the arm into its starting position shown in FIGS. 9 and 10, said spring pressure preventing any riding over the front steep surface of the recess 49 in the ring 48. During transportation or when the tractor indicator is not required, it is necessary to lift the arm 46 above the steep section of the recess 49 in the ring 48, whereupon the spring urges the arm forwardly into engagement with the abutment 50, so as to extend in the direction of progression, as illustrated in FIG. 10 in interrupted lines. The engagement of the arm 46 in the recess 49 can be reinforced or reduced inasmuch as the spring illustrated in FIG. 13 is designed so as to exert an adjustable vertical pressure.

Lastly, it is also possible to control from the driver's seat the shifting of the machine out of its operative position into its transportation position and reversely, to shift it back out of its transportation position into its operative position.

To this end, the distributing nose including the impact wall 2 in the distributing machine illustrated is subdivided into three parts, of which the outer parts, to the right-hand side and to the left-hand side, are adapted to be rocked upwardly round the line 51. Said outer parts of the nose are provided each with a bracket 52 and an eye 53 (FIG. 10); said eye is engaged by a rod 54 leading to the central frame through the arms 55 and 56. The terminal eye of the arm 55 is pivotally secured to the rod 54, whereas the terminal eye of the other arm 56 controls a rod 57 carrying a handle located within reach of the driver on the tractor, said handle being secured to the non-visible front end of said rod. The driver need not leave the seat of the tractor and even during progression, he can operate the rod 57 until it impinges on an abutment which is not illustrated, so that one or both outer parts of the nose are selectively engaged, so as to be shifted out of the operative position according to FIGS. 9 and 10 for which they assume a horizontal location, into the transportation position illustrated in interrupted lines in FIG. 9, for which the total breadth of the machine is reduced to the desired value allowing passage along narrow tracks.

To return the machine out of its transportation position into its operative position, it is sufficient to release the rod 57 out of its locking position for which the part or parts of the nose are again released or set in their lower position.

What I claim is:

1. A hopper arrangement for feeding and mixing granulated material or the like, comprising, in combination, an upright funnel-shaped container adapted to be filled with said material, said container having a central axis and a discharge opening at the bottom through which said material is to be discharged; a rotatable shaft extending along said axis; a pair of resiliently flexible wall sections extending transversely through said container and being operatively connected to said shaft for rotation therewith; means for rotating said shaft about its axis, whereby during such rotation said wall sections will resiliently flex when said container is filled and resiliently straighten out again as the material is discharged from said container; a stationary plate located beneath and closely spaced from said discharge opening and coaxial therewith, said plate being formed with an annular cavity directed toward said discharge opening so as to form an annular shoulder adjacent the periphery of said plate; and a star-shaped member located between said plate and said discharge opening and coaxially fixed to said shaft for rotation therewith, said star-shaped member abutting against said shoulder and extending with peripheral portions thereof in radial direction beyond said shoulder.

2. A hopper arrangement for feeding and mixing granulated material or the like comprising, in combination, an upright funnel-shaped container adapted to be filled with said material, said container having a central axis and a discharge opening at the bottom through which said material is to be discharged; a rotatable shaft extending along said axis; a pair of resiliently flexible wall sections extending transversely through said container and being operatively connected to said shaft for rotation therewith; means for rotating said shaft about its axis, whereby during such rotation said wall sections will resiliently flex when said container is filled and resiliently straighten out again as the material is discharged from said container; a stationary plate located beneath and closely spaced from said discharge opening and coaxial therewith, said plate being formed with an annular cavity directed toward said discharge opening so as to form an annular shoulder adjacent the periphery of said plate; a star-shaped member located between said plate and said discharge opening and coaxially fixed to said shaft for rotation therewith, said star-shaped member abutting against said shoulder and extending with peripheral portions thereof in radial direction beyond said shoulder; and a plurality of projections fixed to and extending from said star-shaped member into said cavity of said plate.

3. A hopper arrangement for feeding and mixing granulated material or the like comprising, in combination, upright container means adapted to be filled with granulated material or the like, said container means having a central axis and a discharge opening at the bottom through which said granulated material is to be discharged; resiliently flexible wall means extending transversely through said container means; drive means operatively connected to one of said forementioned means for rotating the same about said axis relative to the other of said forementioned means, whereby during such rotation said wall means will resiliently flex when said container means is filled and resiliently straighten out again as the material is discharged from said container means; and mechanically operated signalling means for indicating when the level of the material in said container drops during discharge of the material below a preselected level.

4. A hopper arrangement for feeding and mixing granulated material or the like comprising, in combination, upright container means adapted to be filled with granulated material or the like, said container means having a central axis and a discharge opening at the bottom through which said granulated material is to be discharged; resiliently flexible wall means extending transversely through said container means and having a pair of wall sections respectively located on opposite sides of said axis; a plurality of projections fixed to and projecting in one direction substantially normal to and away from one face of each of said wall sections; and drive means operatively connected to said wall means for rotating the same about said axis in said one direction relative to said container means, whereby during such rotation said wall means will resiliently flex when said container means is filled and resiliently straighten out again as the material is discharged from said container means.

5. A hopper arrangement for feeding and mixing granulated material or the like comprising, in combination, an upright funnel-shaped container adapted to be filled with said material, said container having a central axis and a central discharge opening at the bottom through which said material is to be discharged; a rotatable shaft extending along said axis; a cross rod fixed to said shaft in the region of the upper end of said container and extending transversely to opposite sides of said axis substantially through the whole width of said container; a pair of substantially triangular thin, sheet-like resiliently flexible wall sections extending transversely through substantially the whole width and substantially through the whole height of said container and being respectively connected along the upper edge thereof to opposite portions of said cross rod to said shaft for rotation therewith, said wall sections dividing said container in two compartments adapted to be respectively filled with different materials; and means for rotating said shaft about its axis, whereby during such rotation, when said compartments are filled, said wall sections will resiliently flex to such an extent so as to extend substantially in a plane normal to said axis and passing through said cross rod and said wall sections will resiliently straighten out again as the material is discharged from said container.

6. A hopper arrangement for feeding and mixing granulated material or the like comprising, in combination, upright container means adapted to be filled with granulated material or the like, said container means having a central axis and a discharge opening at the bottom through which said granulated material is to be discharged; resiliently flexible wall means extending transversely through said container means; drive means operatively connected to one of said forementioned means for rotating the same about said axis relative to the other of said forementioned means, whereby during such rotation said wall means will resiliently flex when said container means is filled and resiliently straighten out again as the material is discharged from said container means; means for filling said container means with granulated material or the like; and spacer means in said container means for temporarily forming an empty space therein surrounded by material when said container means is filled and in which the material can subsequently expand.

7. An arrangement as defined in claim 6 in which said spacer means comprises an elongated member insertable into and withdrawable from the interior of said container means.

8. An arrangement as defined in claim 6 in which said spacer means comprises a rigid plate hingedly connected at one side edge thereof to the inner surface of said container means so as to be movable between an active position projecting transversely to said inner surface and an inactive position abutting with one face thereof against said inner surface, flexible wall means connected to and extending between the free side edges of said rigid plate and said inner surface of said container means, and means operatively connected to said rigid plate and extending to the exterior of said container means for moving said rigid plate between said positions thereof.

9. An arrangement as defined in claim 6 in which said spacer means comprises a hollow closed member formed from flexible and expandable material, and means communicating with the interior of said hollow member for feeding pressure fluid thereto and for discharging pressure fluid therefrom to inflate and deflate said hollow member.

10. A hopper arrangement for feeding and mixing granulated material or the like comprising, in combination, an upright funnel-shaped container adapted to be filled with said material, said container having a central axis and a discharge opening at the bottom through which said material is to be discharged; a rotatable shaft extending along said axis; a pair of resiliently flexible wall sections extending transversely through said container and being operatively connected to said shaft for rotation therewith; means for rotating said shaft about its axis, whereby during such rotation said wall sections will resiliently flex when said container is filled and resiliently straighten out again as the material is discharged from said container; and means located at said discharge opening and operatively connected to said shaft for centrifugally throwing the material passing through said discharge opening in a direction transverse to said axis.

References Cited in the file of this patent

UNITED STATES PATENTS

| 407,657 | Henrichsen | July 23, 1889 |
|---|---|---|
| 416,127 | Sorensen | Nov. 26, 1889 |
| 657,419 | Jager | Sept. 4, 1900 |
| 1,107,992 | Parrish | Aug. 18, 1914 |
| 1,116,568 | Cretors | Nov. 10, 1914 |
| 1,164,579 | Curtis | Dec. 14, 1915 |
| 1,691,544 | Dow | Nov. 13, 1928 |
| 1,737,421 | Hirschy | Nov. 26, 1929 |
| 2,672,347 | Rausch | Mar. 16, 1954 |
| 2,991,051 | Jones | July 4, 1961 |

FOREIGN PATENTS

| 518,225 | Belgium | Mar. 31, 1953 |